(12) United States Patent
McCauley et al.

(10) Patent No.: US 6,599,071 B1
(45) Date of Patent: Jul. 29, 2003

(54) DUAL PLATED FASTENERS

(75) Inventors: Lewis D. McCauley, Orchard Park, NY (US); Thomas R. Lanham, Boston, NY (US); David F. Notaro, Amherst, NY (US)

(73) Assignee: McGard, Inc., Orchard Park, NY (US)

( * ) Notice: Subject to any disclaimer, the term of this patent is extended or adjusted under 35 U.S.C. 154(b) by 166 days.

(21) Appl. No.: 09/619,834

(22) Filed: Jul. 20, 2000

Related U.S. Application Data

(63) Continuation-in-part of application No. 09/067,330, filed on Apr. 28, 1998.

(51) Int. Cl.[7] ............................................... F16B 33/06
(52) U.S. Cl. ...................................... 411/378; 411/914
(58) Field of Search ................................. 411/411, 378, 411/900–902, 914

(56) References Cited

U.S. PATENT DOCUMENTS

| | | | |
|---|---|---|---|
| 782,467 A | 2/1905 | Replogle | 411/914 |
| 1,727,590 A | 9/1929 | Ferry | |
| 1,988,926 A | 1/1935 | Thomson | 411/914 |
| 3,294,686 A | 12/1966 | Ayers | 411/914 |
| 3,620,119 A | 11/1971 | King, Jr. et al. | 85/1 C |
| 4,018,133 A | 4/1977 | Chaivre et al. | 85/35 |
| 4,154,139 A | 5/1979 | Hage | 85/41 |
| 4,188,459 A | 2/1980 | Hyner et al. | 411/902 |
| 4,322,195 A | 3/1982 | Rebish et al. | 411/431 |
| 4,681,497 A | 7/1987 | Berecz | 411/377 |
| 4,730,970 A | 3/1988 | Hyner | 411/387 |
| 4,775,272 A | 10/1988 | Toth | 411/429 |
| 5,096,352 A | 3/1992 | Lemelson | 411/914 |
| 5,180,266 A | 1/1993 | Nolan et al. | 411/429 |
| 5,275,892 A | 1/1994 | Hyner et al. | 411/902 |
| 5,324,148 A | 6/1994 | Notaro | 411/373 |
| 5,332,348 A | 7/1994 | Lemelson | 411/902 |
| 5,370,486 A | 12/1994 | Plummer | 411/430 |
| 5,564,876 A | 10/1996 | Lat | 411/902 |
| 5,772,377 A | 6/1998 | Bydalek | 411/429 |

Primary Examiner—Flemming Saether

(57) ABSTRACT

A fastener is embodied as a bolt having a shank with a threaded portion for introduction through an aperture in a work piece is disclosed. The fastener is divided into exposed and unexposed portions when used in the work piece. The fastener comprises a first coating formed on the exposed portion and a second coating formed on the unexposed portion. The first and second coatings are mechanically distinct from each other and substantially non-overlapping. The first coating provides a decorative coating on the fastener. The second coating provides a proper torque-tension relationship between the work piece and the unexposed portion. The second coating deposits relatively uniformly to ensure the unexposed portion will not become oversized. An auxiliary coating may further be applied to all or a portion of the unexposed portion, beneath the second coating. The fastener may also be embodied as a nut, a bolt-lock structure, or a lock nut.

22 Claims, 16 Drawing Sheets

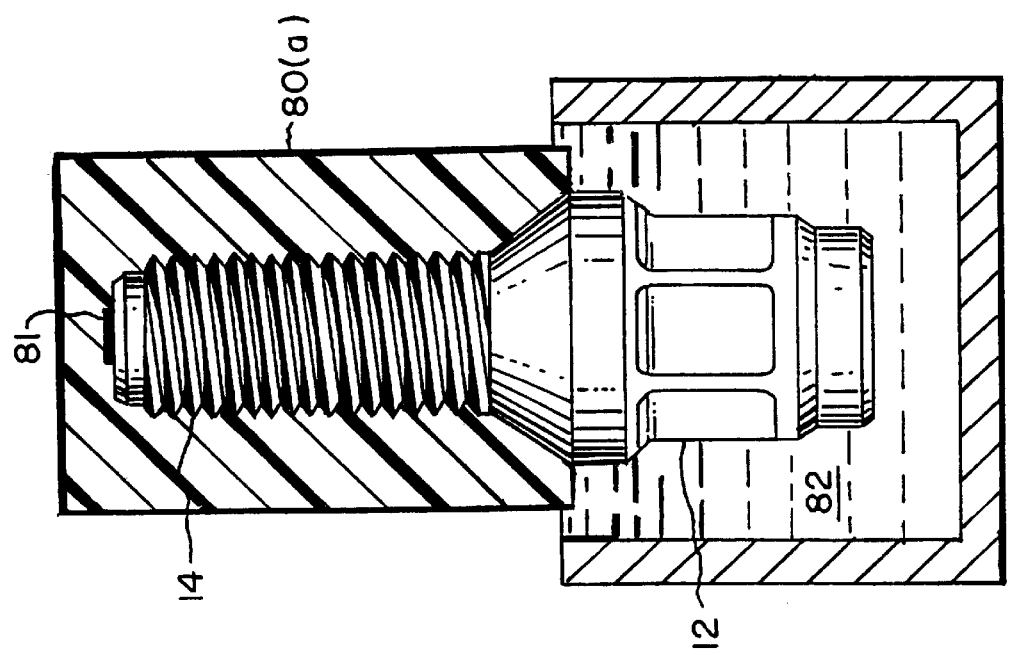
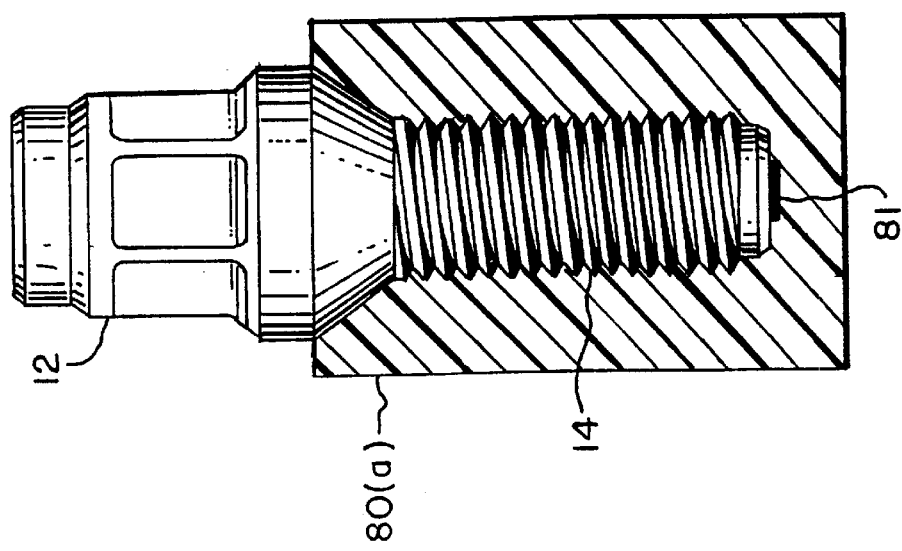
FIG. 4(a)
FIG. 4(b)

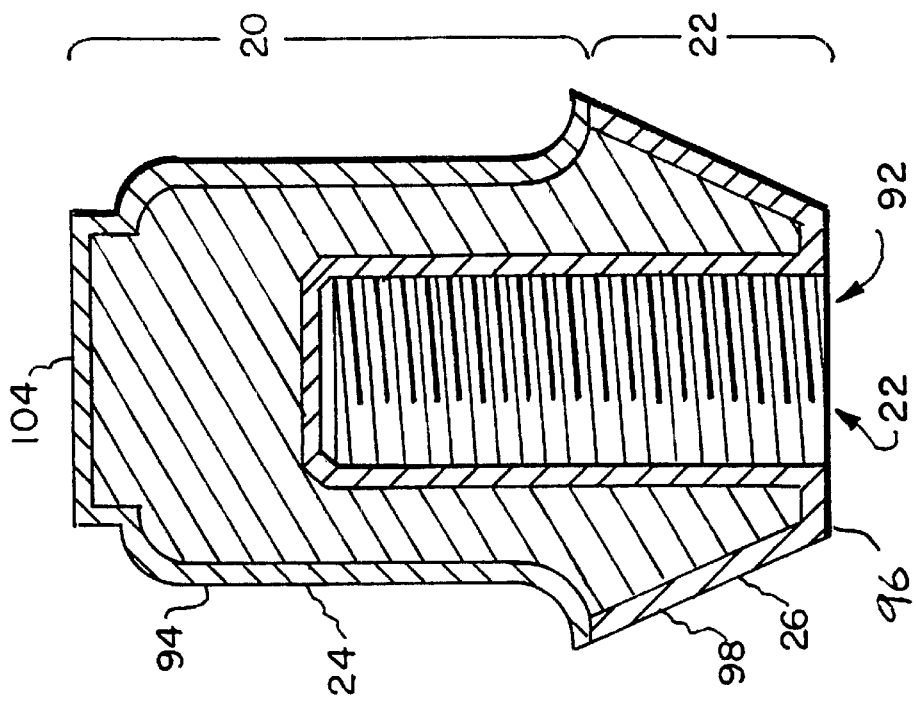
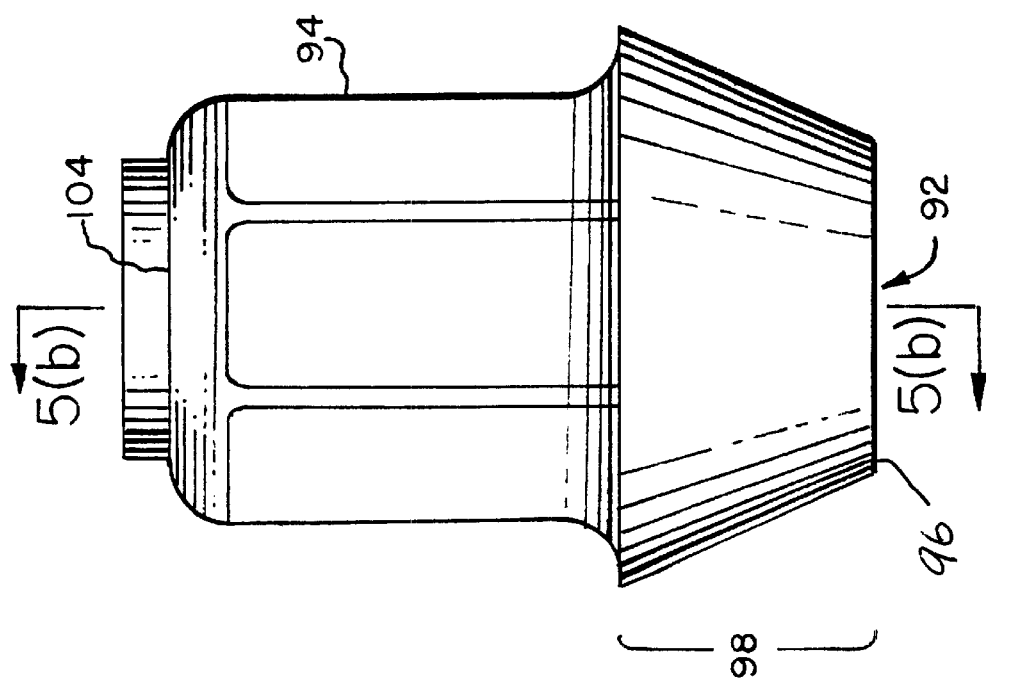
FIG. 5(a)
FIG. 5(b)

DUAL PLATED FASTENERS

CROSS REFERENCE TO RELATED APPLICATIONS

This application is a continuation-in-part of application Ser. No. 09/067,330, filed on Apr. 28, 1998.

FIELD OF THE INVENTION

This invention relates to decorative and reliable fasteners, and particularly automobile wheel lug nuts and bolts.

BACKGROUND OF THE INVENTION

By way of background, lug nuts and lug bolts are commonly used to attach wheels to the axles of automobiles and other vehicles. Lug nuts are most commonly found on American automobiles whereas European automobiles typically employ lug bolts. In a lug nut mounting configuration, the axle rotor or drum to which the wheel is mounted has protruding externally threaded studs. The wheel hub has openings that fit over the studs, and the lug nuts thread onto the studs to hold the wheel in place. In a lug bolt mounting configuration, the rotor or drum has internally threaded openings. The wheel hub also has openings that align with the threaded openings. The lug bolts extend through the wheel hub openings and engage the threaded openings to secure the wheel.

Because lug bolts and nuts must operate in highly corrosive environments, they are usually coated in their entirety with a protective coating. The coating may be decorative or non-decorative. Many decorative coatings, such as those comprising nickel-chrome plating or the like, are highly corrosion resistant and render the fastener more durable in its environment. There are, however, two problems associated with using a decorative coating on a fastener: (1) the decorative coating does not allow a proper torque-tension relationship to develop between the fastener and the wheel hub and (2) such a coating usually deposits non-uniformly on the threaded portion of the fastener, enlarges the threads, and reduces their mechanical holding power. Both conditions tend to alter the retention torque between the nut seat and the wheel hub seat or between the bolt seat and the wheel hub seat. The altered torque may allow the nuts or bolts to loosen. In the worst case, the wheel could fall off the axle.

As an alternative to decorative coatings, manufacturers often coat fasteners with non-decorative coatings. Such coatings, which are typically zinc-based, normally deposit uniformly on the fastener threads and provide the proper torque-tension relationship between the fastener and the wheel hub. More specifically, they provide a soft, sacrificial, cathodic metal that acts as a solid lubricant. As indicated, such coatings are typically zinc-based. Zinc is a well known metal that is easily and inexpensively coated onto a ferrous substrate to galvanize the substrate and provide corrosion and cathodic protection and lubricity. Zinc naturally acquires a protective oxide when it is exposed to air. It therefore resists rust when it is coated on a ferrous product such as a lug bolt or lug nut. When the zinc coating is scratched to expose the underlying metal, the zinc will oxidize before the metal and cover the metal with a zinc oxide coating to prevent oxidation of the metal. Zinc also has a relatively low coefficient of friction and is the preferred coating of choice for lug bolts and lug nuts insofar as it acts as a solid lubricant that assists in tightening the bolts or nuts.

A deficiency of zinc-based and other non-decorative coatings is that they fail to provide the desired aesthetic appearance and usually lack the corrosion-resistant properties of decorative coatings. Moreover, repeated exposure to chemical solvents, such as those used at commercial car wash establishments, can remove a non-decorative coating from the exposed portion of a fastener.

As a result of the foregoing, some manufacturers have resorted to two-piece solutions in which a decorative cap is mounted over the head portion of a fastener that has been coated with a non-decorative coating. Exemplifying this approach are U.S. Pat. Nos. 5,395,196, 5,370,486, 5,180,266, 4,775,272, and 4,018,133. In the designs disclosed in the referenced patents, the decorative caps are pressed, welded or otherwise joined to the non-decoratively coated fastener. The resultant two-piece system provides the mechanical clamping (torque-tension) characteristics of the non-decoratively coated fastener while providing the decorative characteristics of the decorative cap. However, these systems are relatively expensive to manufacture, can suffer from galvanic corrosion at the contacting surfaces of the cap and the fastener (which are of different material), and may lack 100% geometric conformance between the cap and the fastener. The latter two deficiencies can lead to cracks and voids. Weather and mechanical vibration, over time, may even cause the cap to separate from the fastener.

Accordingly, there is a long-standing unmet need for fasteners, and particularly automobile lug nuts and bolts, that are both aesthetically pleasing and mechanically reliable. What is needed is a fastener that provides an acceptable appearance where required, a proper torque-tension relationship between the work piece and the fastener, and a durable, easy to manufacture product.

SUMMARY OF THE INVENTION

The foregoing problems are solved, and an advance in the art is provided, by a one-piece fastener with two distinct coatings applied over selected portions of the fastener. One coating is decorative and corrosion resistant. The other coating is optimized for the desired mechanical holding power. The invention can be made in the form of a bolt or a nut. In the preferred embodiment of the inventive bolt, the bolt has a head and a shank. The head represents an exposed portion of the bolt and is covered with a first decorative/corrosion-resistant coating. The shank includes a tapered seating surface and an elongated threaded portion that passes through a threaded aperture in a wheel axle. The seating surface and the threaded portion of the shank represent an unexposed portion of the bolt. They are covered with a second coating that provides a proper torque-tension relationship between the seating surface and the wheel hub, and between the threaded portion of the shank and the threaded aperture in the wheel axle. The first and second coatings are mechanically distinct from each other.

In the preferred embodiment of the inventive nut, the nut has polygonal sides for engaging a force-applying member, a top surface, a tapered seating surface, and a threaded bore. The polygonal sides and the top surface represent an exposed portion of the nut. They are covered with a first decorative/corrosion-resistant coating. The seating surface and the threaded bore represent an unexposed portion of the nut. They are covered with a second coating that provides a proper torque-tension relationship between the seating surface and the wheel hub, and between the threaded bore and a stud extending from the wheel axle.

The fastener may also be another type of fastener, such as a bolt-lock structure or a lock nut. A color coating can be used to associate the bolt-lock or lock nut with a force-applying member (such as a wrench) having a mating locking key.

In a further aspect of the invention, a fastener such as a bolt or a nut is coated with an auxiliary coating over all or part of its unexposed portion prior to application of the above-mentioned second coating. The auxiliary coating is preferably different from the second coating. The first coating is applied over the exposed portion of the fastener and the second coating is applied over the entirety of the unexposed portion of the fastener, including the parts that were coated with the auxiliary coating. The foregoing configuration has certain processing advantages. Moreover, the auxiliary coating serves to protect the fastener in areas where the second coating could be removed by solvents or other environmental agents.

BRIEF DESCRIPTION OF THE DRAWINGS

FIGS. 4(a)–4(d) are side elevation views, with portions shown in cross-section for clarity, illustrating successive steps of a method to apply protective coatings to the bolt fasteners of FIG. 1;

FIG. 5(a) is a side elevational view of a lug nut fastener;

FIG. 5(b) is cross-sectional view of the lug nut fastener of FIG. 5(a) taken along line 5(b)—5(b) in FIG. 5(a);

DETAILED DESCRIPTION OF THE INVENTION

Figure 1:
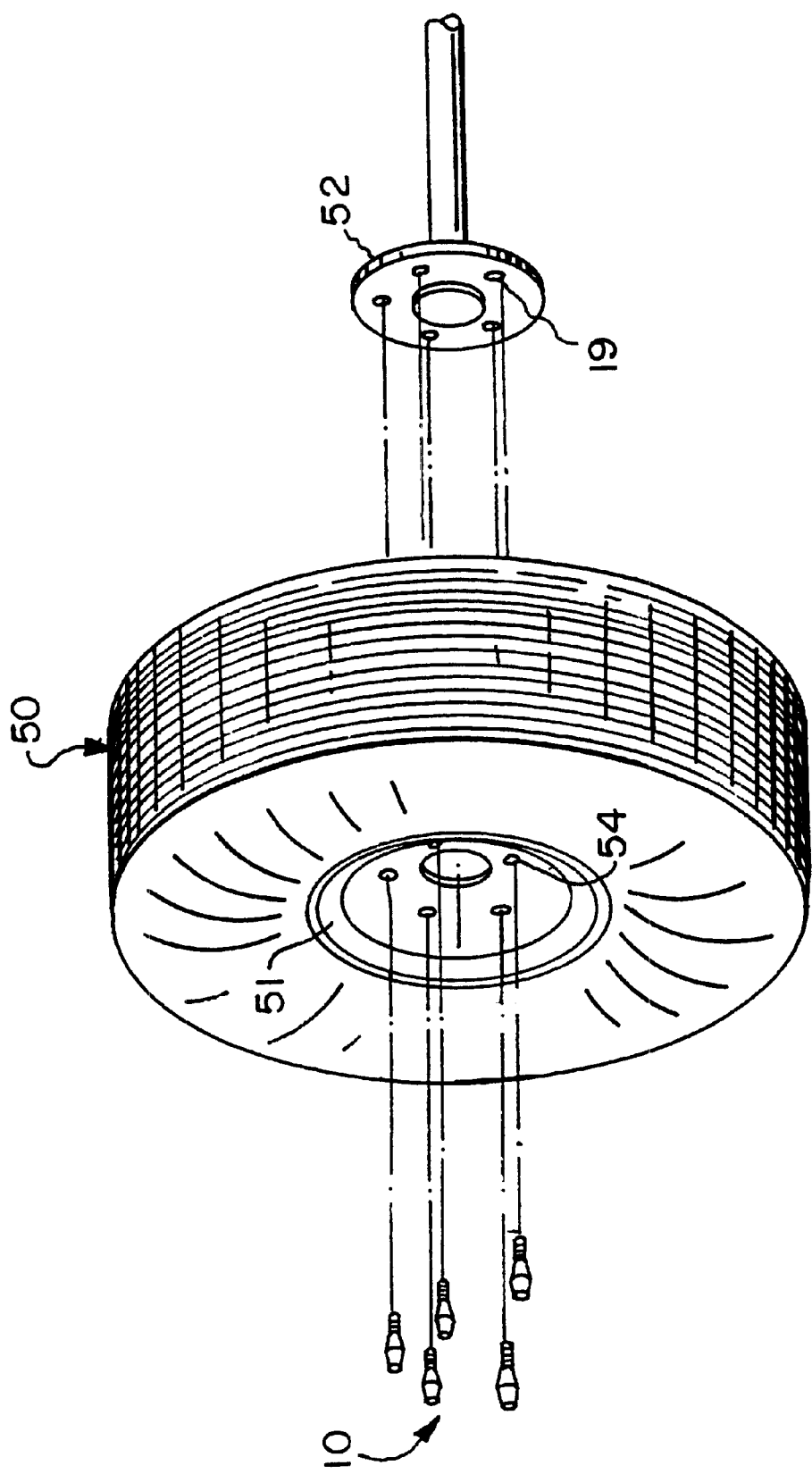
FIG. 1 is an exploded view of a bolt fastener securing a wheel to a car axle.

FIG. 1 illustrates an exploded view of a plurality of lug bolt fasteners 10 securing the hub 51 of a wheel 50 to a vehicle axle 52. Each aperture 54 of the wheel hub 51 corresponds to one threaded aperture 19 of the axle 52, and each receives a single bolt fastener 10. Although not shown in FIG. 1, a tapered wheel hub seat area is formed around each aperture 54 to seat the received bolt fastener 10. To that end, the wheel hub seat area is shaped to engage a corresponding seating surface (see below) formed on the bolt fastener 10.

Figure 2:
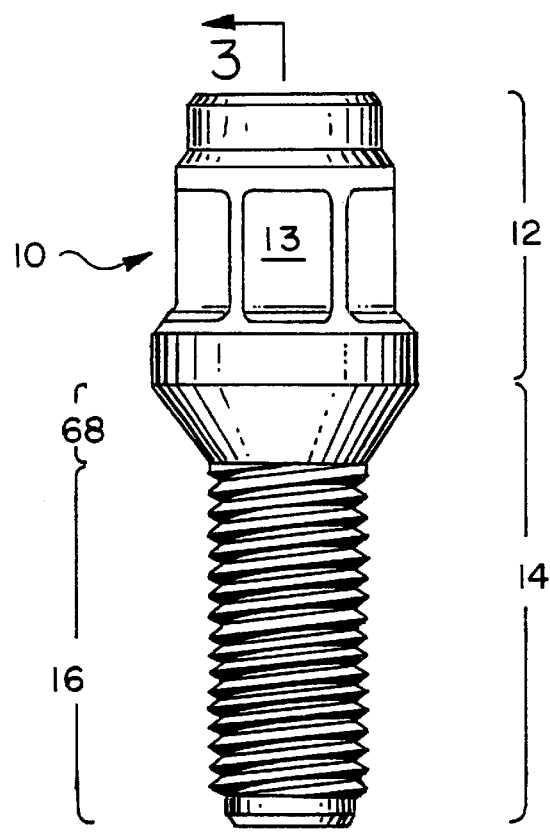
FIG. 2 is a side elevational view of one of the bolt fasteners of FIG. 1.
Figure 3:
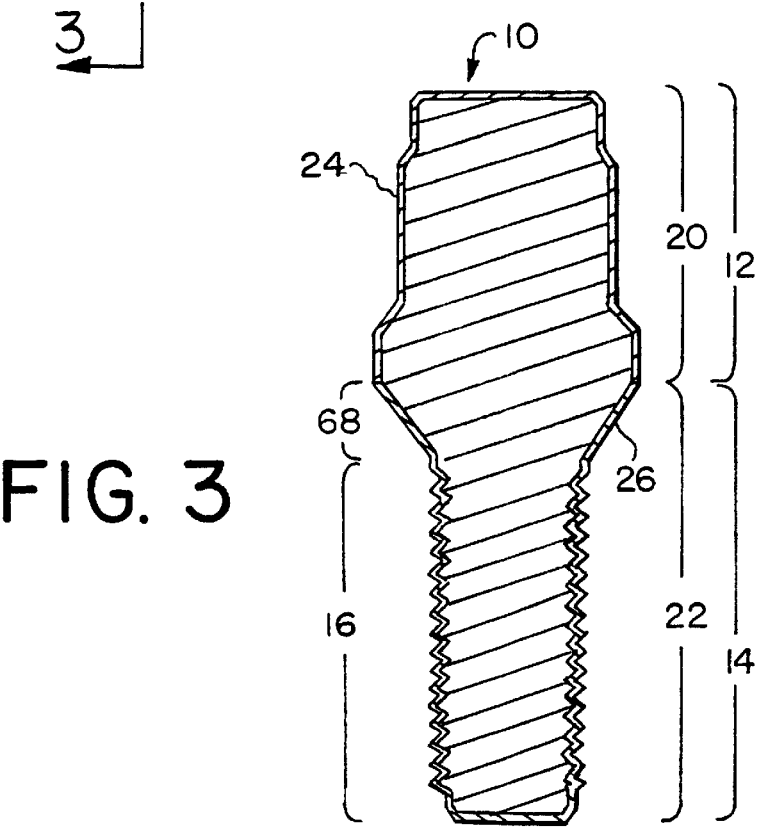
FIG. 3 is a cross-sectional view of the bolt fastener of FIG. 1 taken along line 3—3 in FIG. 2.

FIGS. 2 and 3 are enlarged views of the bolt fastener 10 of FIG. 1. As can be seen, the bolt fastener 10 includes a head 12 and a shank 14. The shank 14 has a threaded portion 16 and a tapered flange 68 providing a seating surface. Although the flange 68 is shown as being frustoconical, it will be appreciated that the flange could also be radiused or otherwise configured depending on the configuration of the wheel hub seat area it is designed to engage. The bolt fastener 10 can be made from any conventional metal or alloy, such as aluminum or steel. The head 12 has a wrench receiving portion 13. A wrench or other force-applying device can engage the portion 13 and applies force to the head 12. Depending on the direction of the force, the shank 14 will either enter or exit one of the preexisting threaded apertures 19 in the axle 52.

FIG. 3 illustrates a cross-sectional view of the bolt fastener 10 of FIG. 2 taken along line 3—3. As shown, the bolt fastener 10 will have an exposed portion 20 and an unexposed portion 22 when the bolt fastener is seated in an operational position. As used herein, "exposed" means exposed to view and to the environmental elements such as rain, snow, dirt, etc. "Unexposed" means shielded from environmental elements. In the bolt fastener 10, the exposed portion 20 corresponds to the head 12 and the unexposed portion 22 corresponds to the shank 14. The shank is the unexposed portion of the bolt fastener 10 because it is covered by the wheel hub apertures 54 and by the threaded axle apertures 19 when the bolt fastener is seated in its operational position.

As further shown in FIG. 3, a first coating 24 coats the exposed portion 20, and a second coating 26 coats the unexposed portion 22. The first coating 24 and the second coating 26 are mechanically distinct from each other. For example, the first coating 24 is preferably a decorative coating whereas the second coating 26 is preferably a non-decorative coating.

Besides being a decorative coating, the first coating 24 is preferably also a protective layer for the bolt fastener 10. The first coating 24 can thus be formed by one or more layers of any conventional corrosion protection coating, such as nickel-chrome, black chrome, decorative chrome, gold, platinum, and other precious metals and alloys. Such coatings are durable when exposed to highly corrosive cleaners and natural elements. The second coating 26 is selected to provide a proper torque-tension relationship between the tapered flange 68 and the above-described wheel hub seat area, and between the threaded portion 16 and the threaded aperture 19 of the axle 52. Proper torque-tension depends upon the coefficient of friction of the second coating 26 on the unexposed portion of the bolt fastener 10. When the proper torque is applied to the bolt fastener 10, the second coating 26 allows a tension to develop that properly and safely mounts the wheel 50 on the axle 52. An acceptable second coating 26 can be formed by one or more layers of flake, organic zinc, electrolytic zinc, mechanical zinc, vacuum-deposited zinc, zinc coating, zinc-nickel, cadmium, iron phosphate, and polytetrafluoroethylene dips.

Figure 4D:
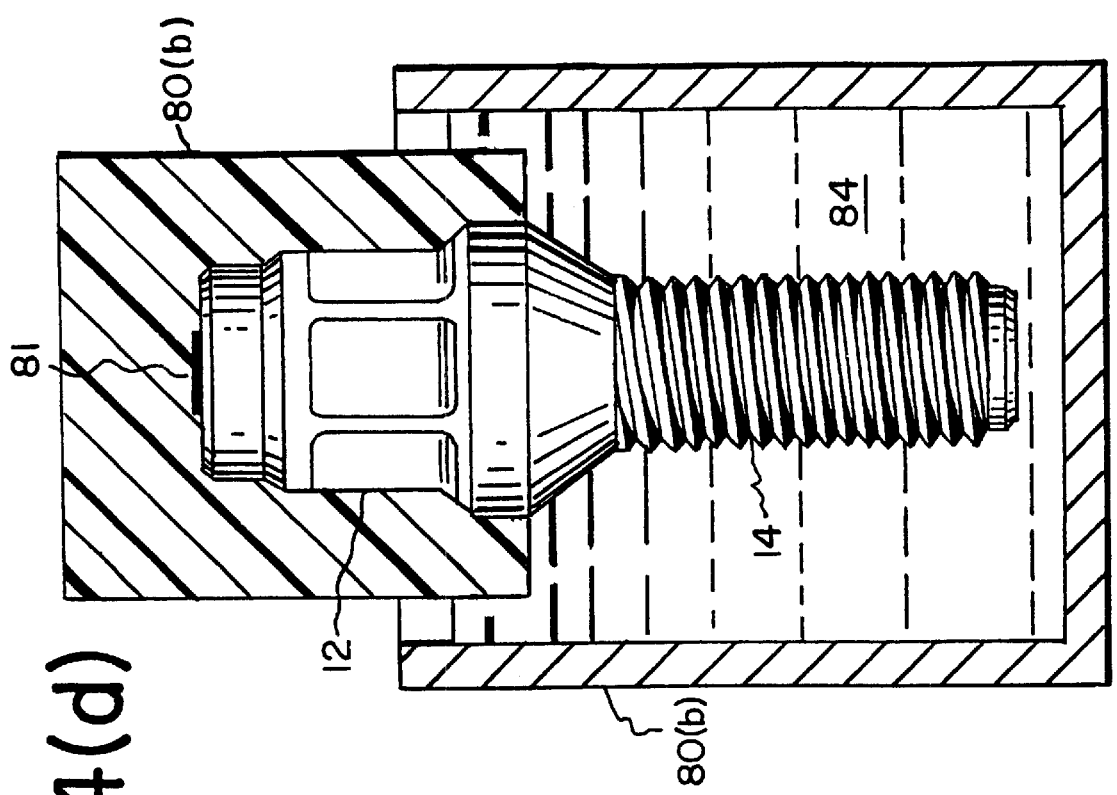

An exemplary method to fabricate the bolt fastener 10 in accordance with the present invention is illustrated in FIGS. 4(a)–4(d). FIGS. 4(a) and 4(b) show how the first coating 24 can be applied. In FIG. 4(a), a shield 80(a) receives the shank 14. The shield 80(a) can be made from polypropylene or any other suitable material that from protects the unexposed portion 22 from being coated with the first coating 24. If the first coating 24 is applied using electroplating (e.g., if it is a nickel-chrome coating), the shank 14 will be brought into electrical contact with an electrical source 81. FIG. 4(b) shows the bolt fastener 10 and the shield 80(a) entering an electroplating bath 82, where the first coating 24 is plated onto the exposed head 12.

Figure 4C:
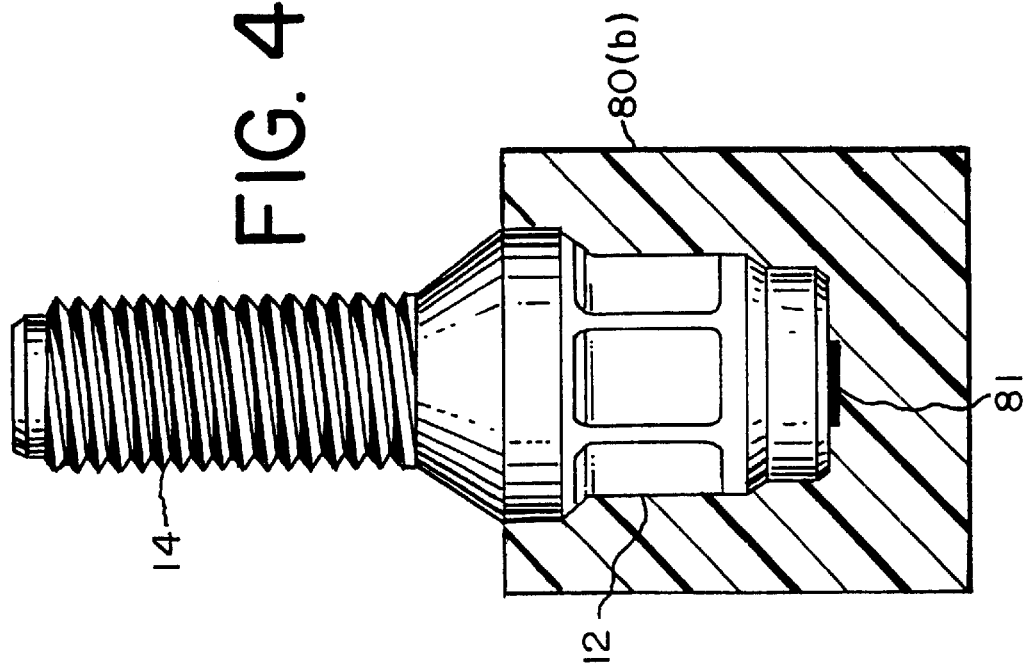

FIGS. 4(c) and 4(d) show how the second coating 26 can be applied. In FIG. 4(c), the head 12 is covered with a shield 80(b), which may be the same as the shield 80(a) depending on the configuration of the head 12. If the second coating is to be applied using electroplating, the head 12 will be brought into electrical contact with the electrical source 81. More typically, however, the second coating will be a zinc-based coating that is applied by dipping, spraying or the like, and not by electroplating. FIG. 4(d) shows the bolt fastener 10 and the shield 80(b) entering a bath 84 containing the second coating material. The second coating 24 coats onto the shank 14 of the bolt fastener 10.

It will be appreciated that the process to fabricate the bolt fastener 10 is not limited to the process shown in FIGS. 4(a)–4(d). Indeed, an alternative process is described below with reference to FIGS. 8 et. seq. As also indicated, the coatings 24 and 26 can be applied using mechanical or vacuum deposition methods or any other suitable deposition method. In these methods, the shields 80(a) and 80(b) will be appropriately constructed to ensure selective application of the coatings 24 and 26 onto the desired portions of the bolt fastener 10.

Figure 5C:
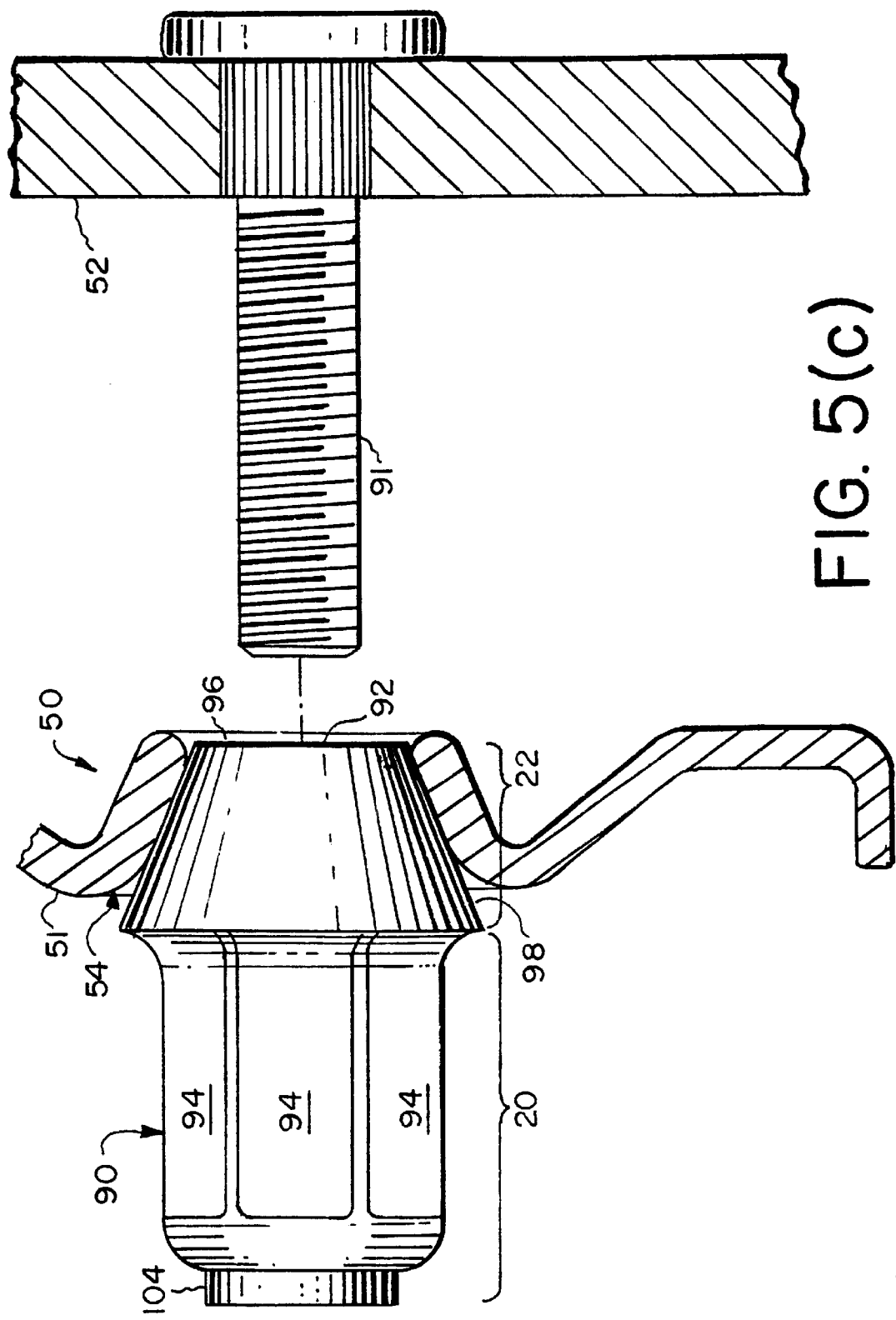
FIG. 5(c) is an exploded side view of the lug nut fastener of FIG. 5(a) in operational engagement securing a wheel to a car axle.

Turning now to FIGS. 5(a)–5(c), another embodiment of the invention is illustrated in which the fastener to be coated is a lug nut fastener 90. As shown in FIG. 5(a), the nut fastener 90 is an elongated member having a central threaded bore 92 and polygonal sides 94 arranged generally parallel to the elongated central axis of the bore 92. A first end 96 of the nut fastener 90 is formed as a tapered flange 98 providing a seating surface. Although the tapered flange 98 is shown as being frustoconical in FIG. 5(a), it will be appreciated that the flange could also be radiused or otherwise configured depending on the configuration of the wheel hub seat area it is designed to engage. A second or opposite end 104 of the nut fastener 90 may be generally flat.

FIG. 5(b) illustrates a cross-sectional view of the nut fastener 90 taken along line 5—5 in FIG. 5(a). In FIG. 5(b), the interior of the threaded bore 92 is shown, as is the structure forming the tapered flange 98, the polygonal sides 94, and the ends 96 and 104. The nut fastener 90 is also shown as having an exposed portion 20 and an unexposed portion 22. The exposed portion 20 comprises the polygonal sides 94 and the second end 104. The unexposed portion 22 includes the tapered flange 98 and the surface of the threaded bore 92. A first coating 24 coats the exposed portion 20 and a second coating 26 coats the unexposed portion 22. The coatings 24 and 26 can be applied in the same manner and method as that shown and described relative to FIGS. 4(a)–4(d). Alternatively, the coatings 24 and 26 may be applied in accordance with the method described below with reference to FIGS. 8–12(c).

As shown in FIG. 5(c), the nut fastener 90 threadably mounts on a stud 91 that is secured to an axle, such as the axle 52 of FIG. 1. The tapered flange 98 bears against the seat area of the wheel hub aperture 54 when the nut fastener 90 mounts onto the wheel hub 51 and the stud 91. The second coating 26 on the unexposed portion 22 provides proper torque-tension relationship between the tapered flange 98 and the wheel hub seat area. The polygonal sides 94 provide a force-receiving structure for receiving a turning force from a wrench or other force-applying member that tightens or loosens the nut fastener 90 on the stud 91.

In yet another embodiment of the invention, the fastener to be coated may be a lock nut or a bolt-lock structure having a lock-key mechanism. Such mechanisms for a lock-key and a bolt-lock structure are fully disclosed in commonly assigned U.S. Pat. Nos. 5,112,176, 5,071,300, 5,062,325, 5,029,808, 4,968,202, 4,897,008, 4,824,305, 4,686,874, and 4,480,513, which are hereby incorporated by reference. The lock-key mechanism ensures that no common force-applying member, such as a standard wrench, can tighten or loosen the fastener. The force-applying member must be a mating key specifically designed for that particular fastener.

Figure 6A:
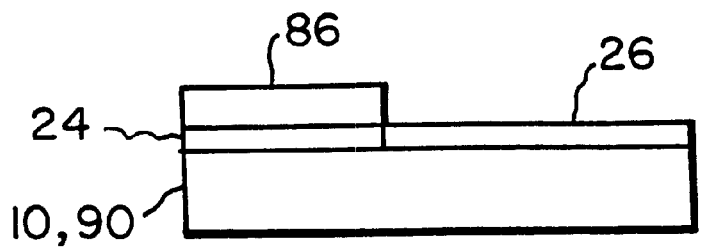
FIGS. 6(a)–6(d) are diagrammatic views illustrating various alternative fastener coating configurations.

To ensure that the correct mating key is inserted into the vehicle, a removable (or non-removable) color coating can be applied to either of the above-described fasteners 10 or 90. Such a color coating is illustrated by reference numeral 86 in FIGS. 6(a)–6(c). In FIG. 6(a), the color coating 86 covers the first coating 24. In another embodiment shown in FIG. 6(b), the color coating 86 covers the second coating 26. In yet another embodiment illustrated in FIG. 6(c), the color coating 86 covers both coatings 24, 26. The color coating 86 can be formed using any conventional dye material that alters the color of the fasteners 10 or 90 to a distinguishable color, such as red, blue, green, or black. The dye material should not adversely effect the size of the fasteners 10 or 90, nor alter their mechanical performance. The appropriate mating key, or a bag containing the appropriate mating key, will be similarly color coded to match the color coating 86. The color coating 86 can preferably be removed by washing the fasteners 10 or 90 with a suitable solvent. Alternatively, the color coating 86 can be made permanent.

Figure 6B:
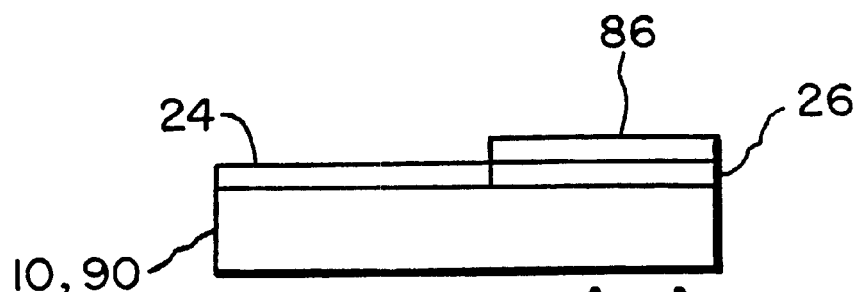
Figure 6C:
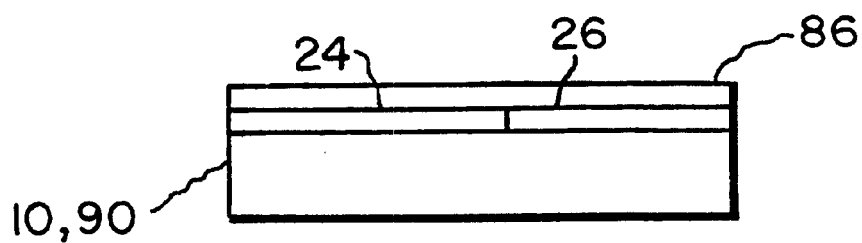
Figure 6D:
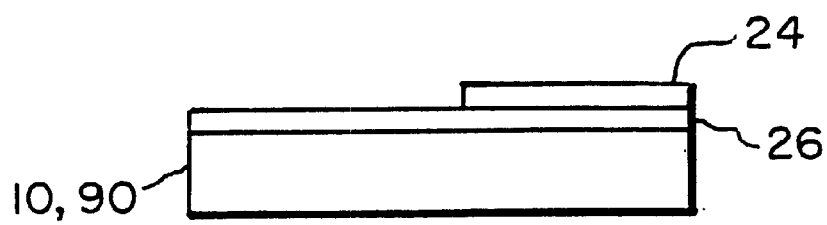

In yet another embodiment of the present invention, shown in FIG. 6(d), the second coating 26 coats the entire fastener 10 or 90. The first coating 24 then coats the exposed portion 20 of the fastener 10 or 90. Alternatively, the color coating 86 may be applied to cover the structure of FIG. 6(d) in the same manner and method as shown in FIGS. 6(a)–6(c).

Figure 7:
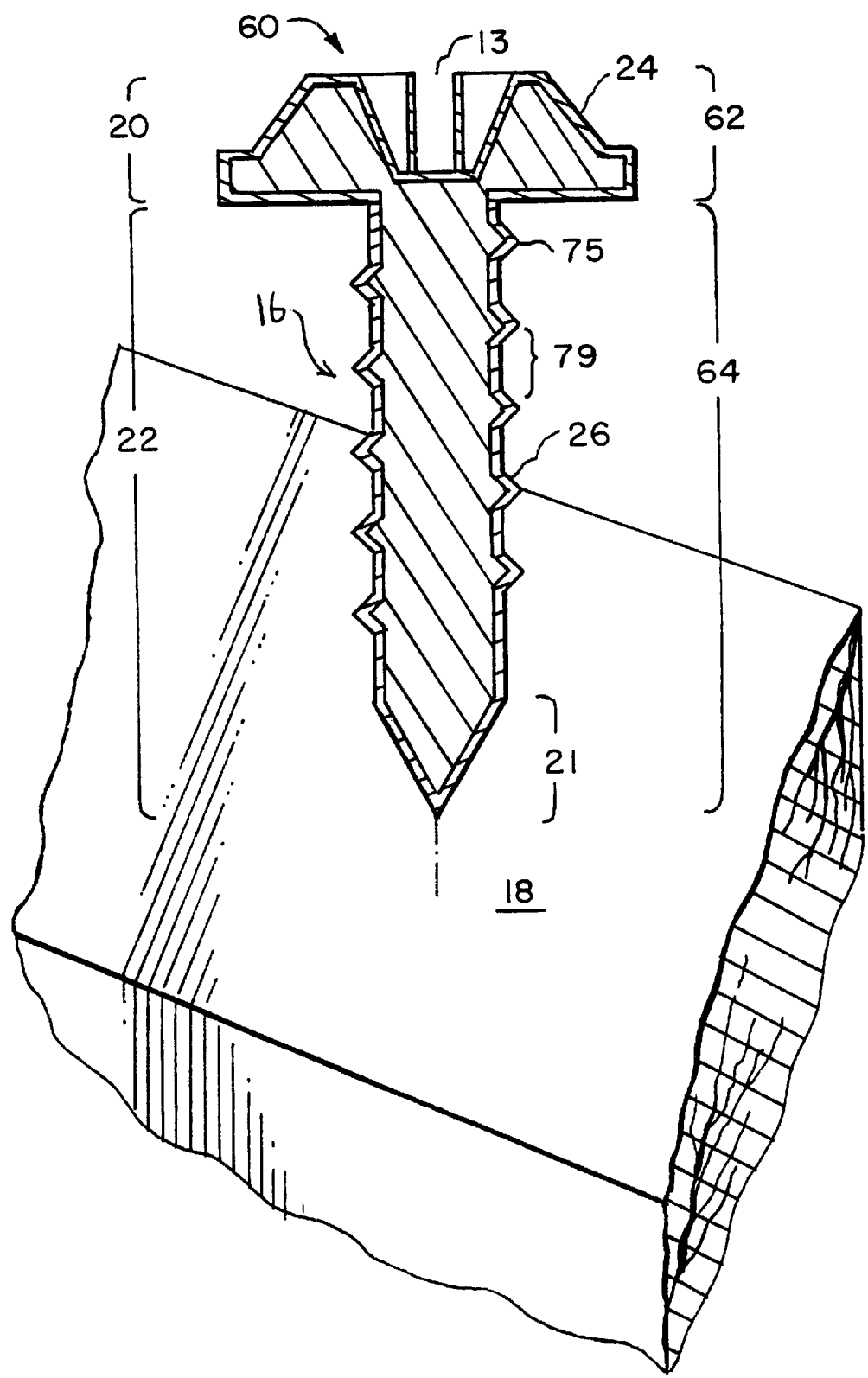
FIG. 7 is an alternate embodiment of the bolt fastener of FIG. 2.

FIG. 7 illustrates an alternative configuration of the bolt fastener 10 shown in FIG. 2. In particular, FIG. 7 illustrates a self-threading fastener 60. The self-threading fastener 60, unlike the bolt fastener 10, is inserted into a work piece 18 by a screwdriver or like device (not shown). The self-threading fastener 60 has two distinct parts: a head 62 having an insert 13 for the screwdriver, and a shank 64. The shank 64 has a threaded area 16 formed by edges 75 and spaces 77, and a sharp tip 21. The sharp tip 21 starts the self-threading fastener 60 into the work piece 18. The work piece 18 may have an aperture (not shown) that the self-threading fastener 60 enters. If there is no aperture, the self-threading fastener 60, in this example a screw, when driven into the work piece 18, creates an aperture by virtue of the tip 21. The self-threading fastener 60 also has an exposed portion 20 and an unexposed portion 22, each being covered with respective first and second coatings 24 and 26.

Turning now to FIGS. 8(a)–8(c) and 9(a)–9(c), another embodiment of the invention is shown relative to a bolt fastener 110. Like the bolt fastener 10 of FIGS. 2 and 3, the bolt fastener 110 includes a head 112 and a shank 114. The shank 114 has a threaded portion 116 and a tapered flange 168 providing a seating surface. The bolt fastener 110 also has an exposed portion 120 and an unexposed portion 122 when the bolt fastener is seated in an operational position. The exposed portion 120 corresponds to the head 112 and the unexposed portion 122 corresponds to the shank 114.

Figure 8A:
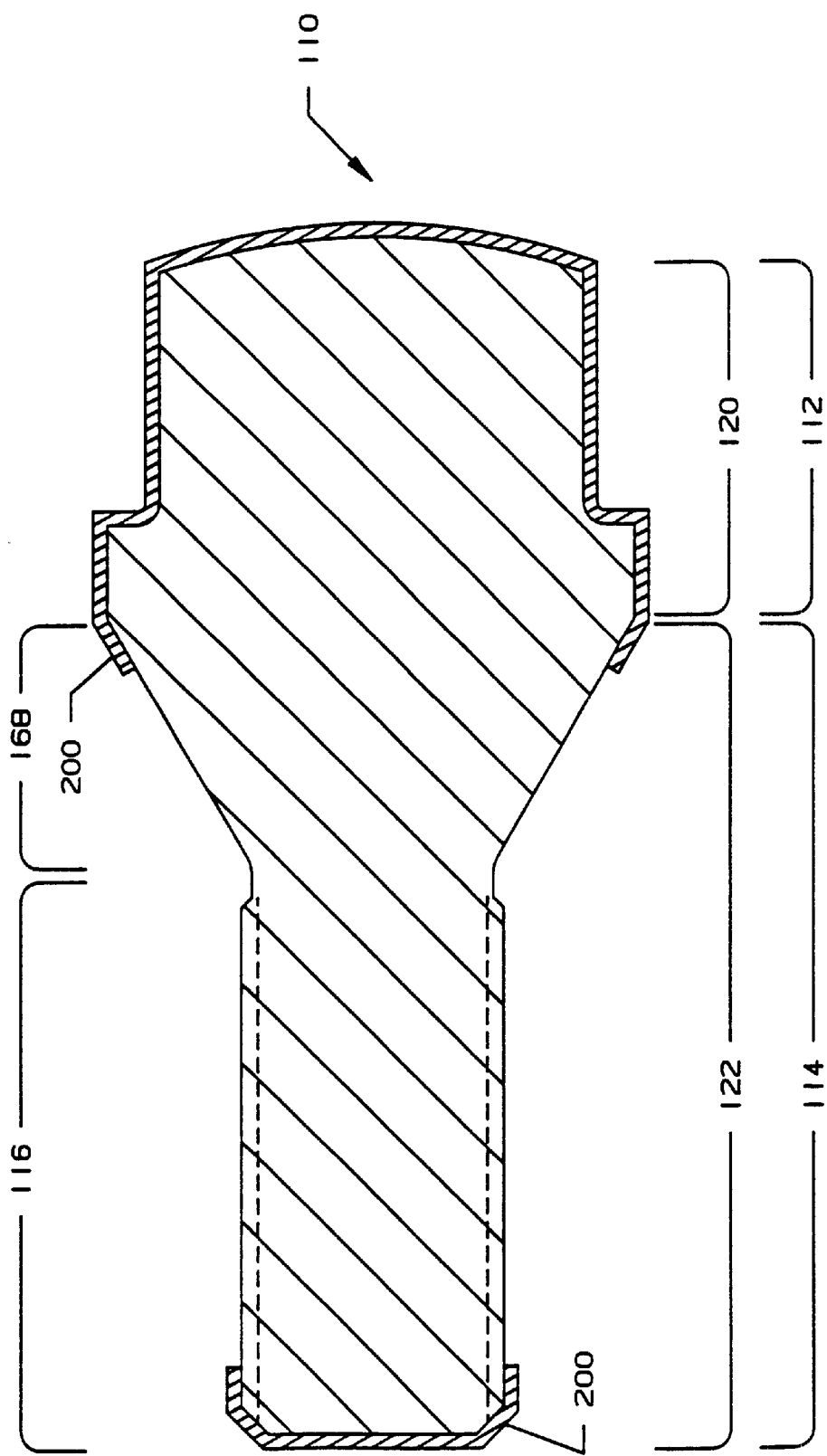
FIGS. 8(a)–8(c) are cross-sectional views showing successive protective coatings applied to a bolt fastener in accordance with a first alternative coating configuration.
Figure 8B:
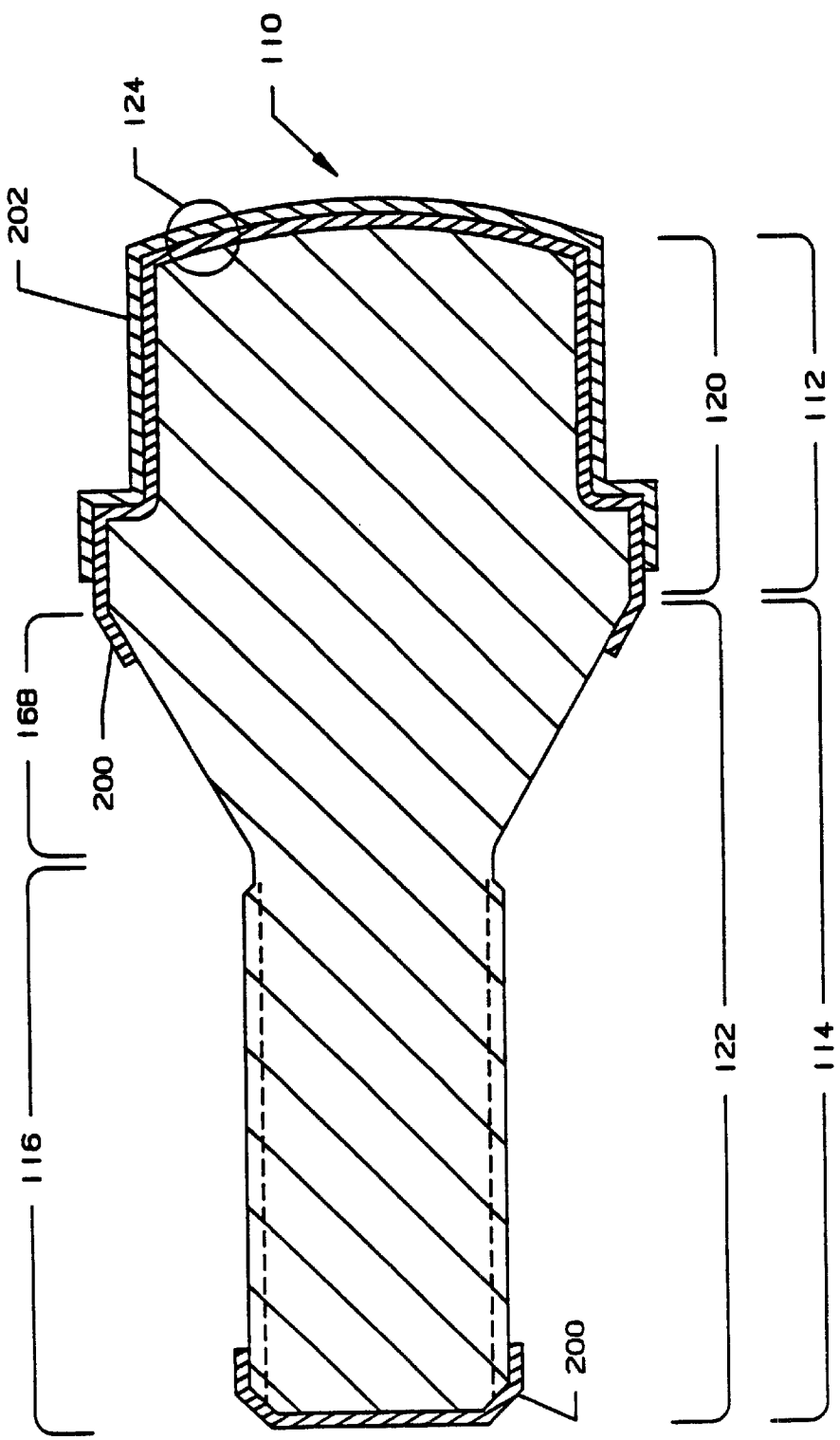
Figure 8C:
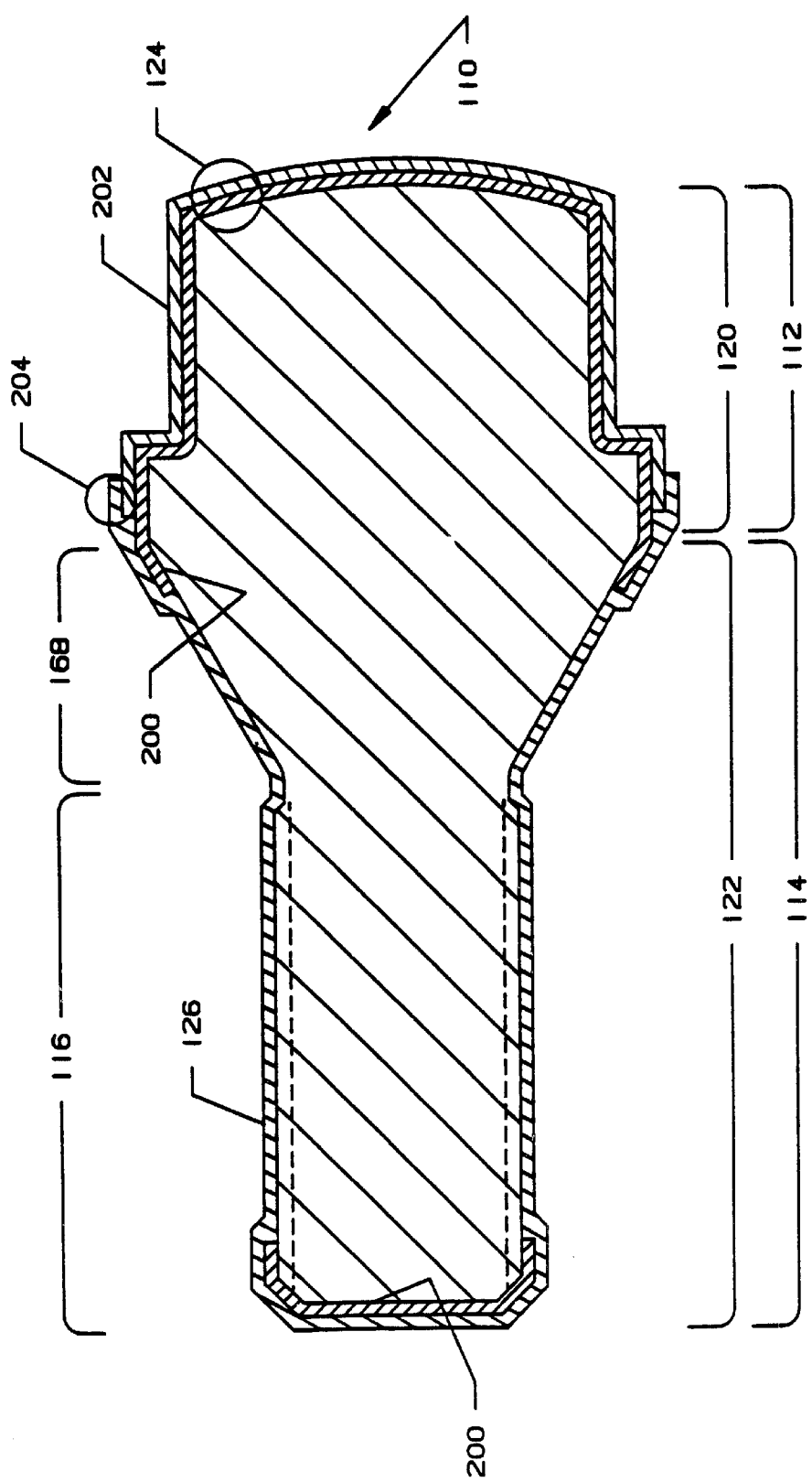
Figure 9A:
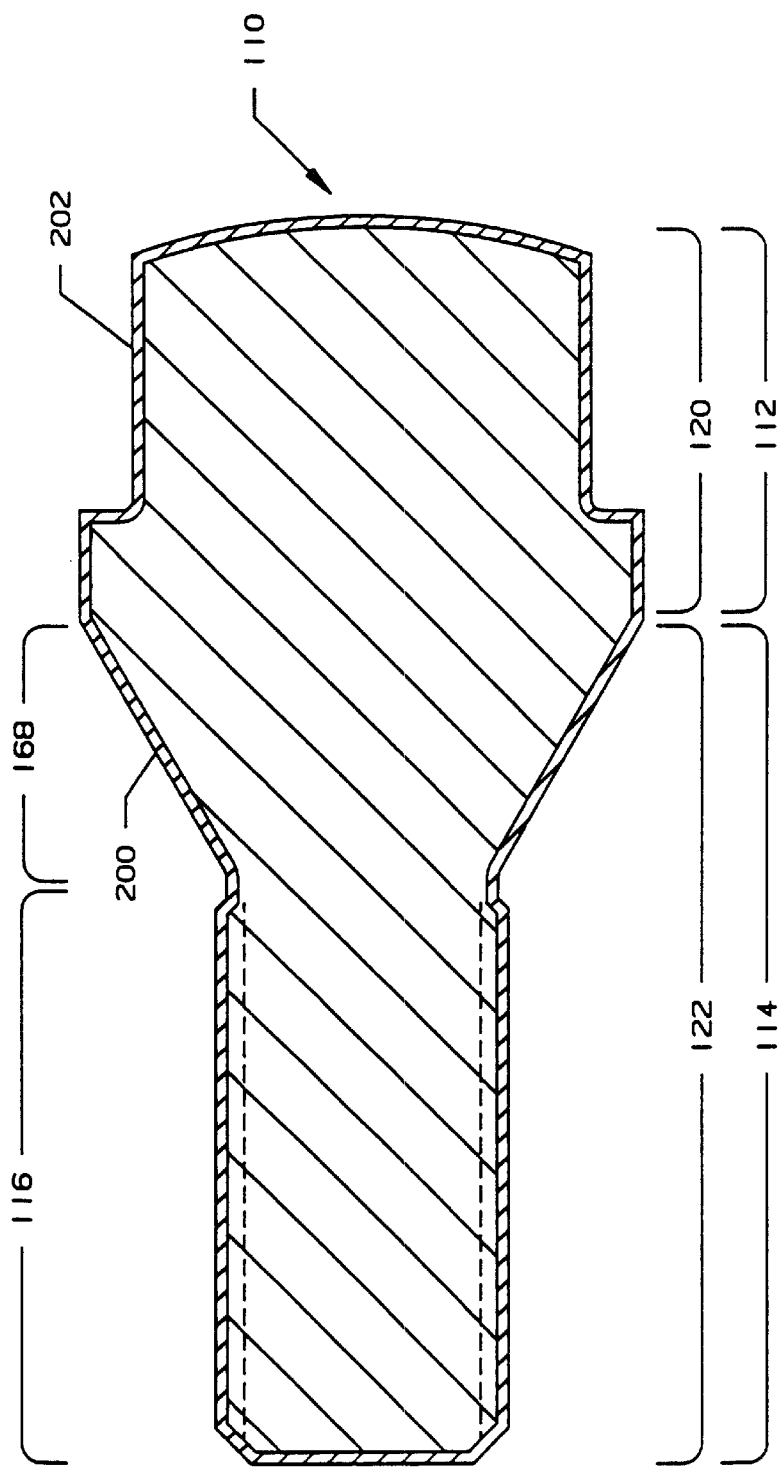
FIGS. 9(a)–9(c) are cross-sectional views showing successive protective coatings applied to a bolt fastener in accordance with a second alternative coating configuration.
Figure 9B:
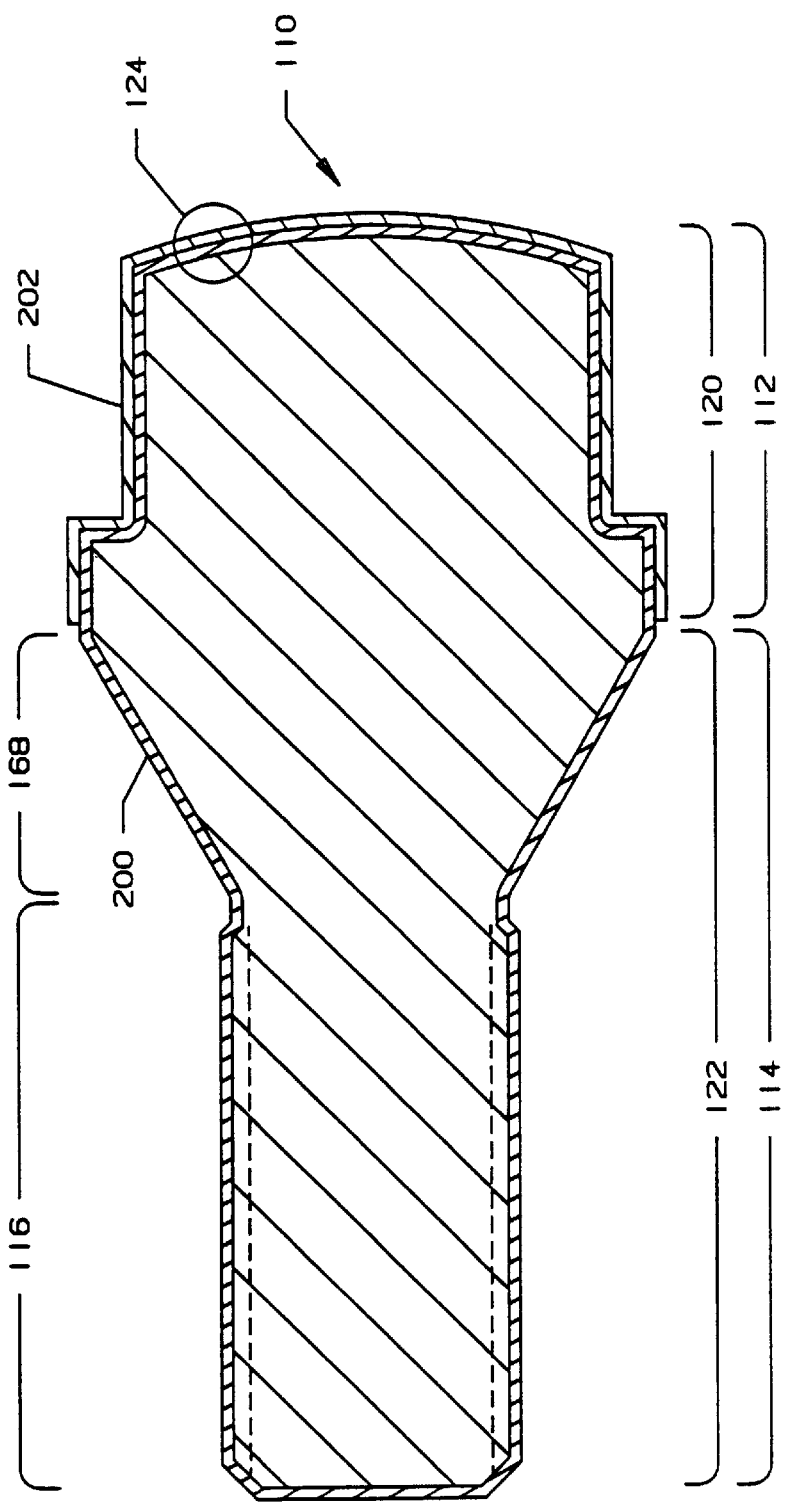
Figure 9C:
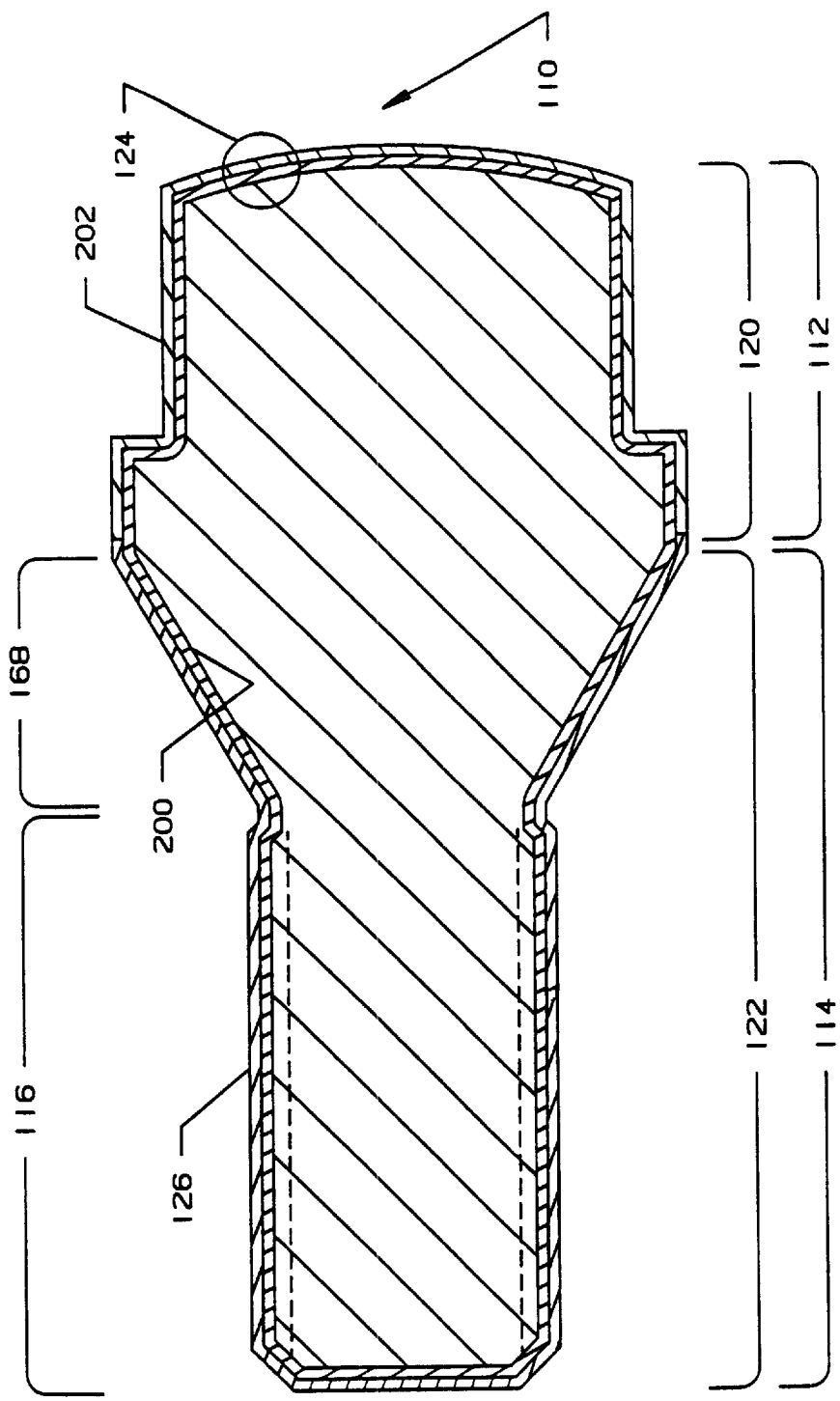

As further shown in FIGS. 8(c) and 9(c), a first coating 124, which could be a single- or multi-layer coating (a multi-layer coating is shown), coats the exposed portion 120. A second coating 126 coats the unexposed portion 122. The first coating 124 and the second coating 126 are mechanically distinct from each other. For example, the first coating 124 is preferably a decorative coating whereas the second coating 126 is preferably a non-decorative coating.

In addition to the second coating 126, all or part of the unexposed portion 122 of the bolt fastener 110 receives an auxiliary coating 200 that is different from the second coating. For reasons explained below, the auxiliary coating 200 may also cover the exposed portion 120, as shown in FIGS. 8(a)–(c) and 9(a)–(c). One purpose of the auxiliary coating 200 is to protect the unexposed portion 122 if loss of the second coating 126 occurs, particularly in areas where the second coating could be compromised by exposure to corrosive elements. These critical areas are the bottom of the shank 114 and the area of the tapered flange 168 that abuts the head 112. Even though these areas are nominally unexposed, it is possible that damaging chemicals could nonetheless find their way into such locations. Another reason for applying the auxiliary coating 200 is to protect the unexposed portion 122 during fabrication. For example, if there are any periods of significant delay during-fastener fabrication in which a surface is left exposed to the elements, rust can accumulate. This could occur, for example, between the time that the first coating 124 is applied to the exposed portion 120 and the time that the second coating 126 is applied to the unexposed portion 122.

The auxiliary coating 200 can be formed from any suitable durable material that is resistant to highly corrosive chemicals or environments. Moreover, the auxiliary coating 200 should be capable of receiving the second coating 126 without significantly affecting the latter material's torque-tension properties. In many cases, the auxiliary coating 200 can be formed by one or more non-decorative layers of the first coating 124. For example, if the first coating 124 comprises a nickel-chrome composition, it will typically include one or more inner layers of non-decorative nickel plating and an outer layer of decorative chrome plating. One or more of the nickel layers can provide the auxiliary coating 200. Advantageously, the auxiliary coating can be applied as part of the process of applying the first coating 124, thereby protecting all or part of the unexposed portion 122 until the second coating 126 is applied.

In FIGS. 8(a)–8(c), the auxiliary coating 200 is applied to specific areas of interest on the unexposed portion 122, namely, the aforementioned area of the tapered flange 168 that abuts the head 112, and the bottom of the shank 114. FIG. 8(a) shows the auxiliary coating 200 being applied to these areas of the unexposed portion 122, as well as the entire exposed portion 120. To achieve such coverage, the auxiliary coating 200 is preferably applied in the manner referred to above as one or more non-decorative layers (e.g., nickel layers) of the first coating 124. FIG. 8(b) shows the addition of a decorative layer 202 (e.g., chrome) of the first coating 124 to the non-decorative layer(s) that were formed on the exposed portion 120 in FIG. 8(a). In FIG. 8(c), the second coating 126 is formed on the unexposed portion 122, including the areas where the auxiliary coating 200 was applied. As shown by reference numeral 204, the second coating 126 may be applied to slightly overlap the first coating 124 near the junction of the exposed and unexposed portions 10 and 122.

In FIGS. 9(a)–9(c), the auxiliary coating 200 is applied to the entirety of the unexposed portion 122. FIG. 9(a) shows the auxiliary coating 200 being applied to this area, as well as the entire exposed portion 120. To achieve such coverage, the auxiliary coating 200 is preferably applied in the manner referred to above as one or more non-decorative layers (e.g., nickel layers) of the first coating 124. FIG. 9(b) shows the addition of a decorative layer 202 (e.g., chrome) of the first coating 124 to the non-decorative layer(s) that were formed on the exposed portion 120 in FIG. 9(a). In FIG. 9(c), the second coating 126 is formed on the unexposed portion 122, thus covering all of the auxiliary coating 200 on the unexposed portion.

The auxiliary coating 200 can be applied using any suitable coating technique. If the auxiliary coating 200 is applied as part of the first coating 124 using an electroplating process, the method disclosed above with reference to FIGS. 4(a)–4(c) can be used, with appropriate modification being made to allow one or more non-decorative layers of the first coating 124 to electrolytically deposit on all or part of the unexposed portion 122. For example, if the auxiliary coating 200 is to cover all of the unexposed portion 122, as shown in FIG. 9(a), the shield 80(a) could be eliminated during application of the non-decorative plating layer(s) of the first coating 124, such that the bolt fastener 110 is completely immersed in the electroplating bath 82 and the entire bolt fastener 110 is plated. The shield 80(a) would then only be used during application of the decorative plating layer(s) of the first coating 124. If the auxiliary coating 200 is to cover only selected areas of the unexposed portion 122, two different shields could be used to apply the first coating 124. Specifically, a first shield used to plate the non-decorative layer(s) of the first coating 124 would be configured to allow the plating material to electrolytically deposit on the desired areas of the unexposed portion 122. A second shield used to plate the decorative layer(s) 202 of the first coating 124 would be configured to allow the plating material to electrolytically deposit on only the exposed portion 20. Alternatively, a single shield could be used that allows the non-decorative layer(s) of the first coating 124, but not the decorative layer(s) 202 of the first coating, to electrolytically deposit on the desired areas of the unexposed portion 22. As is known in the art, coating materials such as nickel plate more efficiently than materials such as chrome. As a result, nickel can be more easily plated onto areas that are not on a direct line of sight with the plating anode(s). In a nickel-chrome plating process, selective electrolytic deposition can be achieved using a single shield by forming apertures and cavities of appropriate size and location in the shield that allow the more efficient nickel to deposit on the unexposed portion 124, but not the less efficient chrome. More particularly, the shield can be formed as a cylinder with an interior wall that is spaced from the bolt fastener 110 in the area of the threaded portion 116 to define an annular cavity. One or more apertures are formed in the cylindrical wall. The apertures permit either nickel or chrome plating solution to freely enter and exit the interior of the cylindrical shield, but only the highly efficient nickel solution will electrolytically deposit on the shielded unexposed portion 122, unlike the inefficient chrome solution which, due to the shield, will not electrolytically deposit on this portion of the bolt fastener.

An example of such a shield will now be described with reference to FIGS. 10–12. In this example, the first coating 124 is applied using a multi-step, multi-layer electroplating process that includes deposition of the auxiliary coating 200. The second coating 126 is applied using a single step dipping, spraying, or vacuum deposition process that does not involve electroplating.

Figure 10:
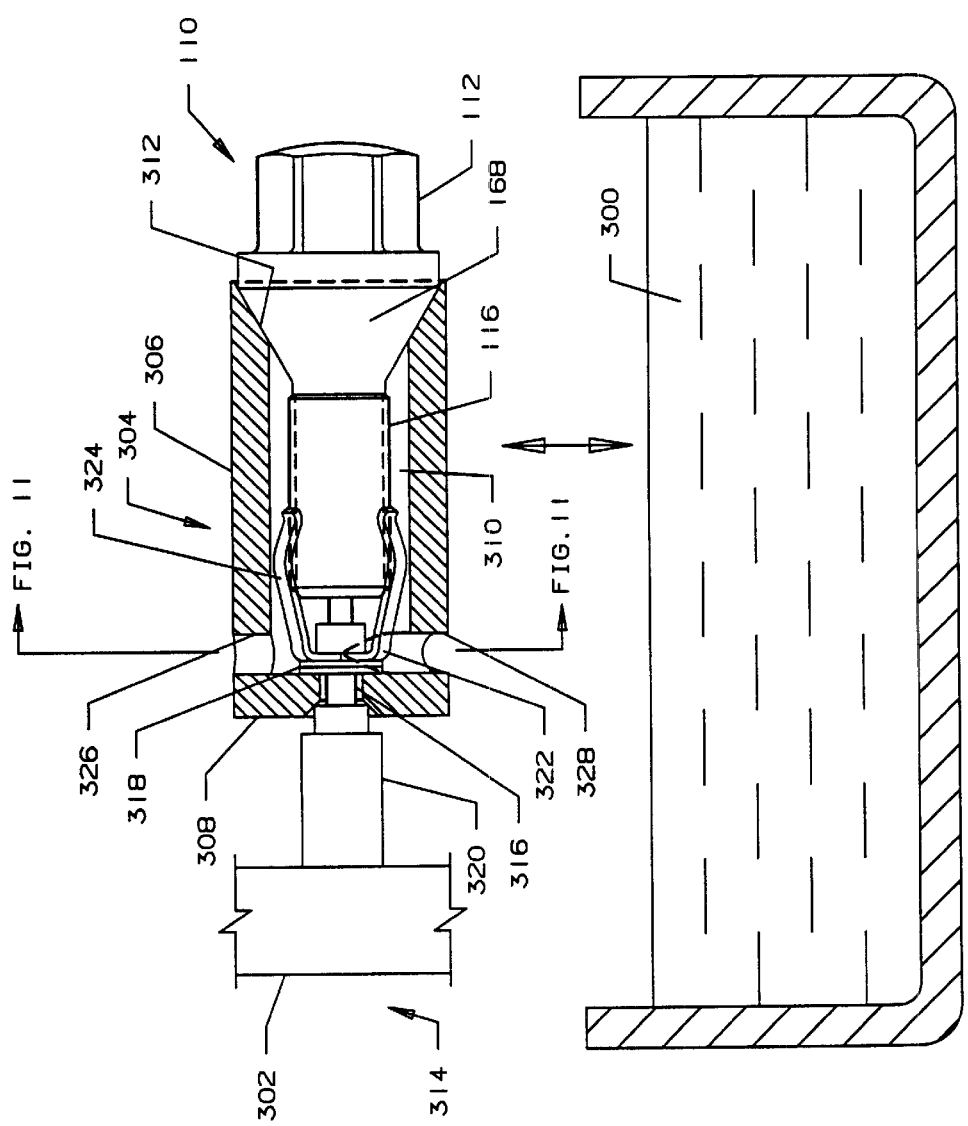
FIG. 10 is a diagrammatic side view showing a shield for electroplating a first coating and an auxiliary coating on a bolt fastener.

FIG. 10 shows an exemplary setup that can be used to form the first coating 124 (and the auxiliary coating 200) on the bolt fastener 110. In accordance with this setup, there are at least two electroplating baths 300. At least one bath 300 is used to apply a non-decorative plating layer comprising nickel (or the like), and at least one other bath 300 is used to apply a decorative plating layer comprising chrome (or the like). Preferably, there are multiple non-decorative plating layers. By way of example, there may be a total of four baths 300, with three baths being used to sequentially apply three nickel plating layers, and the fourth bath being used to apply a final chrome plating layer.

In a production environment, it is preferable to plate multiple bolt fasteners 110 simultaneously in a single bath 300. To that end, a dipping fixture 302, made from copper or the like and capable of carrying several dozen or more bolt fasteners 110, is used. Mounted to the fixture 302 are a plurality of shields 304, made from polypropylene or the like, that each hold a single bolt fastener 110 during plating. Each shield 304 has a generally cylindrical side wall 306, a base 308, and a hollow interior 310 extending from the base to a tapered opening 312. The tapered opening 312 is configured to face the tapered flange 168 of the bolt fastener 110. Each shield 304 is attached to the fixture 302 by way of a fastening system 314 that includes a bolt 316, a pair of washers 318, and an insulative mounting post 320 made from steel or the like and coated with a dielectric plastic material. The bolt 316 extends through axially aligned apertures formed in the shield base 308, the fixture 302, and the mounting post 320.

In addition to holding the shield 304, the fastening system 314 is connected to a power source (not shown) to provide an electroplating current to the bolt fastener 110. This current is delivered to the bolt fastener 110 by way of the bolt 316 and a metal spring clip 322. The spring clip 322 mounts under head of the bolt 316 and has plural spring arms 324 to grip the threaded portion 116 of the bolt fastener 110. It will be appreciated that the shield 304 and the spring clip 322 should be sized so that the unexposed portion 122 of the bolt fastener 110 will be fully received within the shield when the bolt fastener is clamped by the spring clip. In this configuration, the bolt fastener's tapered flange 168 will face the tapered opening 312 of the shield 304, but will preferably be slightly spaced therefrom to allow penetration of the nickel plating material, as described in more detail below.

Figures 11, 12:
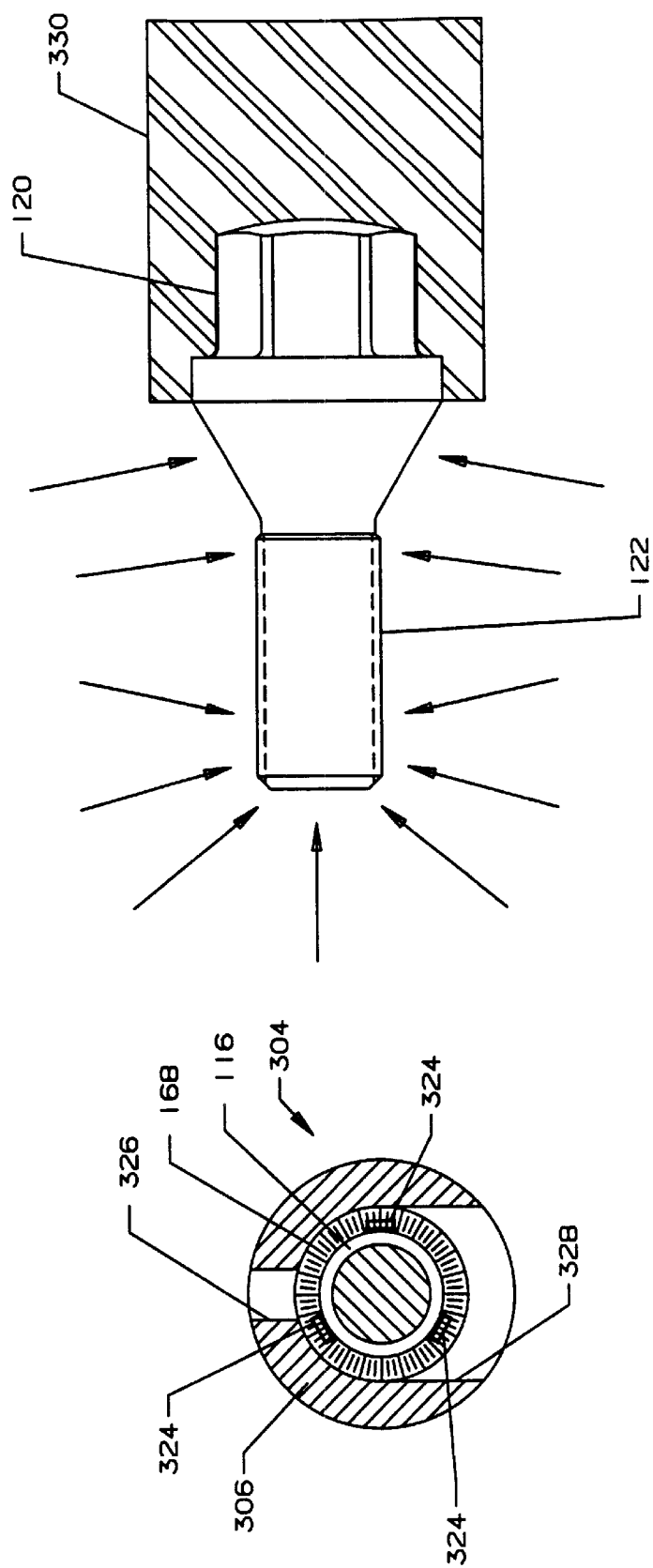
FIG. 11 is a cross-sectional view taken along line 11—11 in FIG. 10.
FIG. 12 is a diagrammatic side view showing a shield for applying a second coating on a bolt fastener.

With additional reference now to FIG. 11, it will be seen that the shield 304 is formed with an upper aperture 326 and a lower aperture 328. Both apertures are sized and configured to allow either the nickel or chrome plating material to freely enter and exit the interior 310 of the shield 304. As stated, however, only the highly efficient nickel solution will electrolytically deposit onto the shielded unexposed portion, whereas the inefficient chrome solution will not. By making the apertures 326 and 328 relatively small, the nickel plating material will tend to electrolytically deposit onto at least the terminal end of the bolt fastener's threaded portion 116. By making the apertures 326 and 328 relatively large, the nickel plating material will tend to electrolytically deposit onto the all of the threaded portion 116 and lower portion of the tapered flange 168. As mentioned above, the upper portion of the bolt fastener's tapered flange 168, i.e., the area near the bolt head 112, can be nickel plated by providing a non-water-tight area (e.g., a slight gap) between the tapered flange 168 and the tapered opening 312 of the shield 304.

In this way, when the bolt fastener 110 is dipped into a nickel plating bath 300, the bolt fastener, including all or part of the unexposed portion 122, will be nickel plated. On the other hand, the aforementioned apertures and gaps should not be so large as to allow chrome plating material to electrolytically deposit onto the unexposed portion 122 when the bolt fastener 110 is dipped into a chrome plating bath 300, such that only the exposed portion 120 will be chrome plated.

Although both apertures 326 and 328 can be circular in shape, the lower aperture 328 is preferably formed as a slot, as shown in FIG. 11, to help provide the additional function of allowing electroplating bath material to quickly drain from the interior 310 of the shield 304 between successive electroplating dips.

Following the application of successive nickel and chrome plating layers to the bolt fastener 110 to create the auxiliary coating 200 and the first coating 124, the bolt fastener is coated with the second coating 126, as shown in FIG. 12. Specifically, the exposed portion 120 of the bolt fastener 110 is mounted in a second shield 330 and the second coating is applied to the unexposed portion 122. The arrows in FIG. 12 illustrate the application of the second coating 126. As previously stated, the second coating is preferably a non-decorative zinc-based material that is applied by dipping, spraying, vacuum deposition, or the like, and not by electroplating.

The invention has been described in detail with particular reference to certain preferred embodiments thereof, but it will be understood that variations and modifications can be effected within the spirit and scope of the invention.

We claim:

1. A fastener to mount a wheel onto a vehicle, said fastener comprising:
   exposed and unexposed portions when used on the vehicle, said exposed portion being unitary and monolithic with said unexposed portion;
   a first coating formed on said exposed portion in contacting interfacially bonded relationship therewith;
   a second coating formed on said unexposed portion in contacting relationship therewith;
   said second coating comprising a second coating material that is relatively softer than said first coating and which provides a solid, lubricious surface for producing a proper torque tension-relationship between said vehicle and said unexposed portion;
   said second coating material being readily oxidizable on its surface to form a natural protective oxide layer and having a cathodic characteristic that transforms said material into a protective coating when said second coating is removed to expose underlying portions of said fastener; and
   said first and second coatings being mechanically distinct from each other and substantially non-overlapping.

2. The fastener of claim 1 wherein the second coating is a non-decorative coating.

3. The fastener of claim 1 wherein said second coating comprises zinc.

4. The fastener of claim 1 wherein said first coating provides a protective layer that resists highly corrosive cleaners and natural elements.

5. The fastener of claim 4 wherein said first coating comprises one or more layers comprising nickel and chrome.

6. The fastener of claim 1 wherein said fastener is selected from the group consisting of a nut, a bolt, a lock nut and a bolt-lock structure.

7. The fastener of claim 1 wherein said fastener is a bolt having a tapered seat, a shank and a head, and wherein said exposed portion comprises said head and said unexposed portion comprises said seat and said shank.

8. The fastener of claim 1 wherein said fastener is a nut having a tapered seat, a threaded bore, polygonal sides, and a top end, and wherein said unexposed portion comprises said seat and said bore and said exposed portion comprises said polygonal sides and said top end.

9. The fastener of claim 1 further comprising a color dye coating formed on a portion of said fastener.

10. A fastener, said fastener comprising:
a head;
a shank that is unitary and monolithic with said head, said shank having a threaded portion for introduction into a threaded aperture of a work piece;
a coating comprising nickel and chrome plated on said head in contacting relationship therewith;
a coating comprising zinc plated on said shank in contacting relationship therewith;
said zinc coating being softer than said nickel and chrome coating and providing a natural oxide protection layer and cathodic protection for said shank;
said zinc coating further providing a proper torque tension relationship between said work piece and said shank; and
said nickel and chrome coating and said zinc coating being substantially non-overlapping.

11. The fastener of claim 10, wherein said fastener is selected from the group consisting of a bolt and a bolt-lock structure.

12. The fastener of claim 10 wherein said work piece is a wheel on a vehicle axle.

13. A fastener to be connected with a work piece, said fastener comprising:
predetermined exposed and unexposed portions, said portions being unitary and monolithic relative to each other;
a first coating formed on said exposed portion in contacting interfacially bonded relationship therewith;
an auxiliary coating formed on all or a portion of said unexposed portion in contacting relationship therewith;
a second coating formed on said auxiliary coating and on areas of said unexposed portion not covered by said auxiliary coating, if any, in contacting relationship therewith;
said second coating comprising a material that is relatively softer than said first coating for providing a solid, lubricious surface, said second coating material being oxidizable on its surface to form a natural protective oxide layer and having a cathodic characteristic that transforms said material into a protective coating when said second coating is removed to expose an underlying portion of said fastener;
said second coating further providing a proper torque tension relationship between said work piece and said unexposed portion; and
said first and second coatings being mechanically distinct from each other and substantially non-overlapping.

14. The fastener of claim 13 wherein said second coating is a non-decorative coating.

15. The fastener of claim 13 wherein said second coating comprises zinc.

16. The fastener of claim 13 wherein said first coating provides a protective layer that resists highly corrosive cleaners and natural elements.

17. The fastener of claim 16 wherein said first coating comprises nickel and chrome.

18. The fastener of claim 13 wherein said first coating comprises an outer decorative layer and a non-decorative inner layer that also extends over all or part of said unexposed portion to provide said auxiliary layer.

19. The fastener of claim 13 wherein said fastener is selected from the group consisting of a nut, a bolt, a lockout and a bolt-lock structure.

20. The fastener of claim 13 wherein said fastener is a bolt device having a shank and a head, and wherein said exposed portion comprises said head and said unexposed portion comprises said shank.

21. The fastener of claim 13 wherein said fastener is a nut having a tapered seat, a threaded bore, polygonal sides and a top end, and wherein said unexposed portion comprises said seat and said bore and said exposed portion comprises said polygonal sides and said top end.

22. The fastener of claim 13 further comprising a color dye coating on a portion of said fastener.

* * * * *